(12) United States Patent
Gilchrist et al.

(10) Patent No.: US 7,253,402 B2
(45) Date of Patent: Aug. 7, 2007

(54) APPARATUS AND METHOD FOR DETERMINING THERMAL NEUTRON CAPTURE CROSS SECTION OF A SUBSURFACE FORMATION FROM A BOREHOLE USING MULTIPLE DETECTORS

(75) Inventors: Allen Gilchrist, Houston, TX (US); Darryl E. Trcka, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 10/955,867

(22) Filed: Sep. 30, 2004

(65) Prior Publication Data
US 2005/0067563 A1 Mar. 31, 2005

Related U.S. Application Data

(60) Provisional application No. 60/507,383, filed on Sep. 30, 2003.

(51) Int. Cl.
*G01V 5/04* (2006.01)
*G01V 5/10* (2006.01)
*G06F 19/00* (2006.01)

(52) U.S. Cl. ............ 250/269.7; 250/261; 702/8
(58) Field of Classification Search .......... 250/265, 250/266, 269.1, 269.7
See application file for complete search history.

(56) References Cited

U.S. PATENT DOCUMENTS

| 4,445,033 | A | * | 4/1984 | Preeg et al. ............ 250/266 |
| 4,645,926 | A | | 2/1987 | Randall ................. 250/256 |
| 4,656,354 | A | | 4/1987 | Randall ................. 250/256 |
| 4,668,863 | A | | 5/1987 | Gray et al. ............. 250/256 |
| 4,909,075 | A | * | 3/1990 | Flaum et al. ........... 250/266 |
| 5,808,298 | A | | 9/1998 | Mickael ................ 250/269.6 |
| 5,973,321 | A | | 10/1999 | Schmidt ............... 250/269.6 |
| 6,064,063 | A | * | 5/2000 | Mickael ................ 250/269.7 |
| 6,124,590 | A | * | 9/2000 | Mickael ................ 250/264 |
| 6,566,649 | B1 | * | 5/2003 | Mickael ................ 250/269.3 |
| 2003/0178560 | A1 | | 9/2003 | Odom et al. ........... 250/269.2 |
| 2004/0222368 | A1 | | 11/2004 | Odom et al. ........... 250/269.2 |

OTHER PUBLICATIONS

D. K. Steinman et al.; *Dual-Burst Thermal Decay Time Logging Principles*, SPE Formation Evaluation, Jun. 1988, pp. 377-385.

(Continued)

*Primary Examiner*—David Porta
*Assistant Examiner*—Frederick F. Rosenberger
(74) *Attorney, Agent, or Firm*—Madan, Mossman & Sriram, P.C.

(57) ABSTRACT

A well logging instrument including a plurality of detectors having different precisions and accuracies, the more precise detectors generally having lower accuracies. The detectors are responsive to the interaction of radiation from a suitable source on the instrument with earth formations. Outputs from the plurality of detectors are smoothed and combined to provide processed measurements with improved accuracy and precision.

33 Claims, 3 Drawing Sheets

OTHER PUBLICATIONS

R.E. Plasek et al.; *Improved Pulsed Neutron Capture Logging with Slim Carbon-Oxygen Tools: Methodology*, SPE 30598, SPE Annual Technical Conference and Exhibition, Oct. 22-25, 1995.

H.D. Smith, Jr. et al.; *Obtaining Intrinsic Formation Capture Cross Sections with Pulsed Neutron Capture Logging Tools*, SPWLA Twenty-Ninth Annual Logging Symposium, Jun. 5-8, 1988, pp. 1-24.

Richard C. Odom et al.; *Quantitative Use of Computer Models in Calibration of the Computalog Pulsed Neutron Thermal Decay Tool (PND)*, SPWLA 33rd Annual Logging Symposium, Jun. 14-17, 1992, pp. 1-25.

B.T. Murdoch et al., *Diffusion Corrections to Pulsed Neutron Capture Logs: Methodology*, SPWLA 31st Annual Logging Symposium, Jun. 24-27, 1990, pp. 1-14, 17 Figs.

S. Mandayam et al.; *Wavelet-Based permeability compensation technique for characterizing magnetic flux leakage images*, NDT&E International, vol. 30, No. 5, pp. 297-303, 1997.

\* cited by examiner

APPARATUS AND METHOD FOR DETERMINING THERMAL NEUTRON CAPTURE CROSS SECTION OF A SUBSURFACE FORMATION FROM A BOREHOLE USING MULTIPLE DETECTORS

CROSS-REFERENCES TO RELATED APPLICATIONS

This application claims priority from U.S. Provisional Patent Application Ser. No. 60/507,383 filed on Sep. 30, 2003.

BACKGROUND OF THE INVENTION

1. Field of the Invention

The invention is related to the field of pulsed neutron well logging. More specifically, the invention is an apparatus and method for improving accuracy and precision of capture cross-section measurements.

2. Description of the Related Art

Pulsed neutron well logging instruments are known in the art for determining the macroscopic thermal neutron capture cross-section of earth formations penetrated by a wellbore. Typical pulsed neutron instruments include a controllable source of high-energy neutrons and one or more gamma ray radiation detectors positioned at spaced apart locations from the neutron source. The source is periodically activated to emit controlled-duration "bursts" of high-energy neutrons into the earth formations surrounding the well borehole. These neutrons interact with the atomic nuclei of the materials in the earth formations, losing energy with each interaction until the neutrons reach the thermal energy level (defined as having a most likely energy of about 0.025 electron volts). Depending on the material composition of the earth formations proximal to the instrument, the thermal neutrons can be absorbed (captured), at various rates by certain types of atomic nuclei in the earth formations. When one of these atomic nuclei captures a thermal neutron, it emits a gamma ray, which is referred to as a "capture gamma ray".

The rate at which the capture gamma rays are emitted, with respect to the elapsed time after the end of the neutron "burst" depends on, among other things, the relative concentration per unit volume in the earth formations of those atomic nuclei which have a relatively large tendency to absorb thermal neutrons and emit capture gamma rays in response. This tendency is referred to as the thermal neutron capture cross-section.

The capture cross section, designated as $\Sigma$, of the formation is determined by sending a burst of neutrons from the tool and watching the decline of the gamma ray count rate with time as the neutrons are captured by the surrounding materials (neutron capture) and as they diffuse farther away (neutron diffusion). $\Sigma$ is inferred from this observed decline in the gamma ray count rate versus time. However, in addition to the neutron capture, two key environmental effects contribute to the observed decline, or decay rate: diffusion and the so-called "borehole contamination." These effects need to be carefully characterized in order to determine the correct $\Sigma$ throughout the wide range of operating conditions typically encountered in the oilfield. These effects are controlled by parameters which include borehole size, casing size, casing weight, borehole fluid salinity, porosity, and lithology.

Some approaches to handling these environmental effects have been described in the prior art literature. See, for e.g., Steinman, et al. "Dual-Burst Thermal Decay Time Logging Principles," 1986 SPE Annual Technical conference and Exhibition, New Orleans, La., (Oct. 5-8, 1986), paper SPE 15437; Smith, et al., "Obtaining Intrinsic Formation Capture Cross Sections with Pulsed Neutron Capture Logging Tools," Transactions of the 29th Annual SPWLA Symposium, San Antonio, Tex. (Jun. 5-8, 1988), paper SS; Murdoch, et al., "Diffusion Corrections to Pulsed Neutron Capture Logs: Methodology," Transactions of the 31st Annual SPWLA Symposium, Lafayette, La. (Jun. 24-27, 1990), paper Q; and Odom et al., "Quantitative Use of Computer Models in Calibration of the Computalog Pulsed Neutron Thermal Decay, Transactions of the 33rd Annual SPWLA Logging Symposium, Oklahoma City, Okla. (Jun. 14-17, 1992), paper P.

Under certain wellbore conditions, it is difficult to determine the fractional saturation of oil or gas by processing the capture gamma ray measurements according to methods known in the art for determining the thermal neutron capture cross-section, $\Sigma_F$, of the earth formation of interest. Several factors contribute to this difficulty. First, the well logging instrument is typically inserted into a wellbore which is filled with liquid. At the time the pulsed neutron instrument is typically used, the wellbore generally has inserted therein a steel liner or casing. The liner or casing is generally held in place by cement filling the annular space between the wellbore wall and the exterior of the liner or casing. As high-energy neutrons leave the neutron source in the logging instrument, the mud in the wellbore has the effect of rapidly moderating (or slowing down) the high-energy neutrons to the thermal level due to of the high concentration of hydrogen nuclei in the mud.

In general, the relative numbers of thermal neutrons ("population") at any particular time after a neutron burst, or thermal neutrons in the wellbore and in the earth formations proximal to the wellbore, will depend on the porosity and on the hydrogen nucleus concentration within the earth formation. This population can be "captured," or absorbed by nuclei of various chemical elements in the wellbore and formations, at a rate which depends upon the relative concentration and on the thermal neutron capture cross-section of these elements. In wellbores and in earth formations, some of the more common elements having high thermal neutron cross-sections include chlorine, hydrogen, iron, silicon, calcium, boron, and sulfur. As determined from measurements of capture gamma rays made by the well logging instrument, the thermal neutron decay time (neutron lifetime), represents combined effects of the thermal neutron capture cross-section in each of several regions within the wellbore as well as in the earth formations proximal to the wellbore. These regions include the instrument itself, the fluid in the wellbore, the steel casing, the cement, the earth formations radially proximal to the wellbore wall (which may have been infiltrated by fluid from within the wellbore), and the earth formations radially more distal from the wellbore wall (which have minimal infiltration from the fluid in the wellbore).

Several prior art are aimed at improving measurements in capture cross-section logging. A method and apparatus employing a source and two detectors are discussed, for example, in U.S. Pat. Nos. 4,645,926 and 4,656,354, both issued to Randall. A subsurface instrument includes a long-spaced (LS) and short-spaced (SS) detector for detecting natural or induced gamma ray emissions from subsurface formations. The detectors produce electrical pulses, with each pulse corresponding in time with the incidence of a corresponding gamma ray on the detector and having an analog voltage amplitude correlative of the gamma ray. A method is discussed in Randall '354 for determining presence of a gas by comparing first and second parameters obtained at the detectors. The first parameter is indicative of a count of detected impingements of primarily inelastic gamma radiation upon a detector. The second parameter is indicative of a count of detected impingements of primarily capture gamma radiation upon a detector. Randall '926 discusses a method of determining a parameter of the borehole, wherein primarily inelastic gamma radiation is normalized upon impingement on a detection means.

In U.S. Pat. No. 4,668,863, issued to Gray, et al., an apparatus is used to analyze and process parameters including, for example, the macroscopic thermal neutron absorption capture cross-section of the formation at borehole elevations corresponding to the locations from which such spectra are derived. For acquiring temporal spectral data, a multi-channel scale section is provided which includes a channel number generator which produces a numerical sequence of memory address codes corresponding to a sequence of adjacent time windows. A suitable memory device is part of the downhole apparatus. Each code uniquely defines a start time, whereby the windows collectively comprise the time interval of the desired spectrum. Each time a gamma ray pulse is detected, the memory address generated at that time addresses a corresponding memory location and increments the count value resident therein. At the conclusion of the time spectrum interval of interest, the memory locations may be interrogated by the CPU and the resultant spectral data analyzed, transmitted to the surface, or presented visually as a gamma ray emission count versus time plot. Correlation is made of detection signals in response to impingement of gamma radiation upon first and second detectors.

U.S. Pat. No. 5,973,321, issued to Schmidt, discusses a method for determining the fractional amounts and the thermal neutron capture cross-sections of various regions in a wellbore and regions in earth formations in the vicinity of the wellbore, each having a distinct mean neutron decay time or macroscopic thermal neutron capture cross-section. The method includes generating a data kernel which is made up of representors (models), or potential decay components of the wellbore and of the earth formations in the vicinity of the wellbore. A thermal neutron decay spectrum is measured by a pulsed neutron instrument including a controllable source of high-energy neutrons and one or more gamma ray detectors at spaced-apart locations from the source. The decay spectrum measured by the instrument is inverted to determine model parameters by which the individual representors are scaled so that when combined, the scaled representors most closely match the measured decay spectrum.

U.S. Pat. No. 5,808,298, issued to Mickael, discusses a method for determining the oil saturation in an earth formation penetrated by a wellbore. Measurement of the relative amounts of carbon and oxygen in the wellbore and formation are made by spectral analysis of neutron-induced inelastic gamma rays detected from the earth formation at spaced-apart locations. The method includes calculating an apparent oil holdup in the wellbore at each one of the spaced-apart locations from the measurements of the relative amounts of carbon and oxygen. A corrected oil holdup is calculated in the wellbore from differences between the apparent holdups determined at each of the spaced-apart locations. An apparent oil saturation in the formation is determined at each of the spaced-apart locations from the relative amounts of carbon and oxygen and the corrected oil holdup. A corrected formation oil saturation is determined from differences between the apparent oil saturations at each of the spaced apart locations.

Plasek et al., 1995, "Improved Pulsed Neutron Capture Logging With Slim Carbon-Oxygen Tools: Methodology," SPE Annual Technical Conference & Exhibition, Dallas, Tex., Oct. 22-25, 1995, paper SPE 30598, discusses a method of carbon-oxygen ratio determination using a reservoir saturation tool for determining physical parameters of a formation. In one embodiment of the tool, the source and detectors are cylindrically symmetrical. In an alternate embodiment of the tool, the short-spaced detector is positioned so as to face toward the borehole while the long-spaced detector is positioned against a face of the borehole wall so as to receive signals from inside a formation layer.

A need exists for improving a precision and accuracy of parameter estimation obtained from earth formations. The present invention fulfills this need.

SUMMARY OF THE INVENTION

The present invention is a method and apparatus for determining a parameter of interest of an earth formation with a logging tool having a source for irradiating said earth formation and a plurality of detectors spaced apart from the source for making measurements resulting from interaction of the radiation with the earth formation. The parameter of interest may be a density or porosity of the earth formation. In one embodiment of the invention, a first and second set of measurements are made with first and second detectors. The first detector has a higher precision, higher resolution, and lower accuracy than the second detector. The measurements of the first and second detectors are combined to give measurements with improved accuracy and precision. The combination is effected after filtering the first detector measurements to match the resolution of the second detector. A normalization factor for the first detector measurements is derived from the combined measurement, and then applied to the first detector measurements. A similar method is used when three detectors of varying accuracy and precision are used for making measurements. In another aspect, the invention is a system that includes a conveyance device such as a wireline or a drilling tubular for conveying a logging tool into a borehole, the logging tool having a source for irradiating said earth formation and a plurality of detectors spaced apart from the source for making measurements resulting from interaction of the radiation with the earth formation.

BRIEF DESCRIPTION OF THE DRAWINGS

The present invention is best understood with reference to the attached drawings in which like numerals refer to like elements, and in which.

DESCRIPTION OF PREFERRED EMBODIMENT

Figure 1:
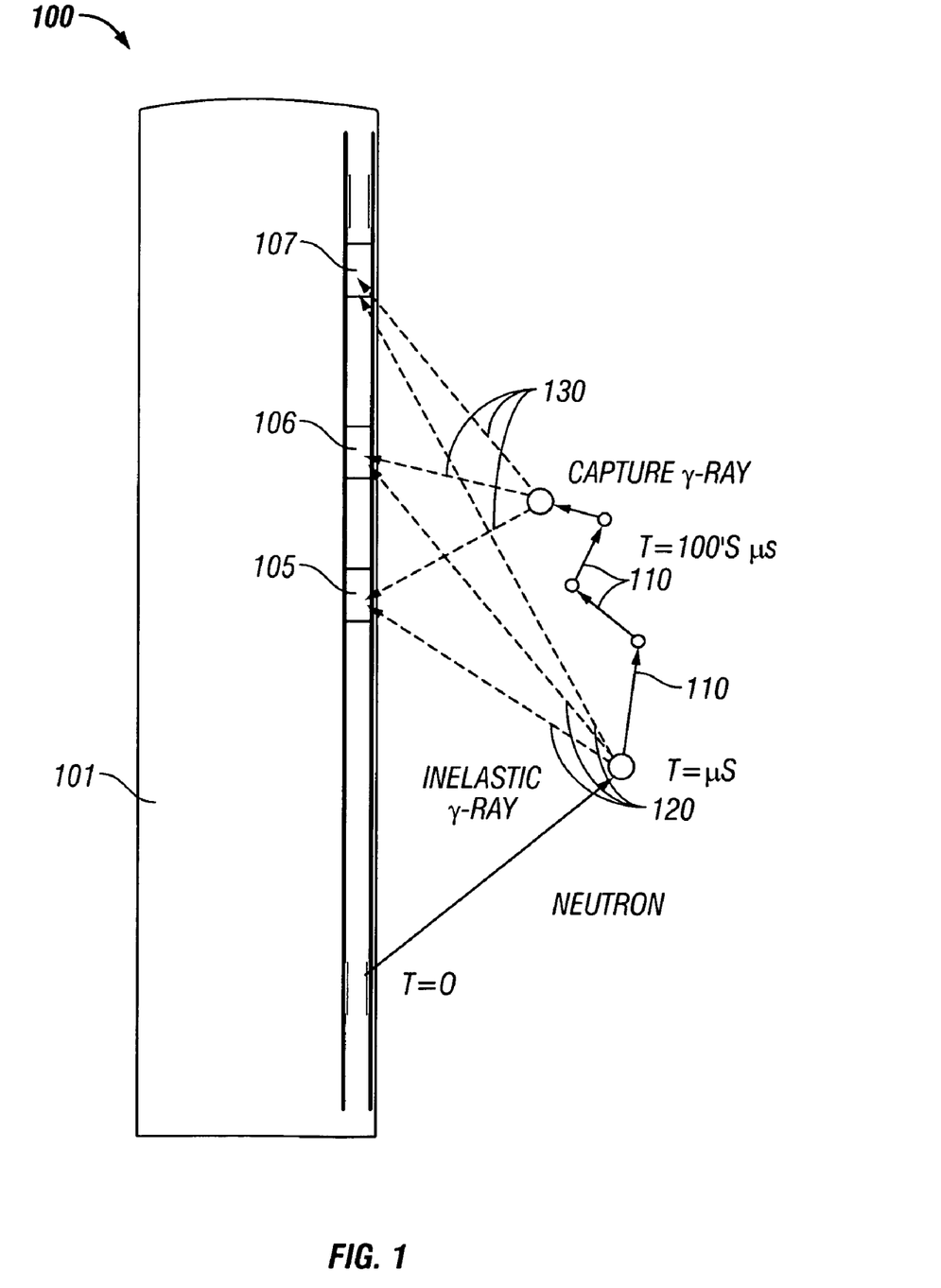
FIG. 1 shows an illustration of an apparatus suitable for use with the present invention.

FIG. 1 shows an illustration of an apparatus suitable for use with the present invention. The apparatus illustrated is that of the Reservoir Performance Monitor (RPM) of Baker Atlas, Incorporated. A measurement device 100 comprises a neutron source 101 and three axially spaced apart detectors described below. The number of detectors shown in the embodiment of FIG. 1 is only example of the number of detectors employed in an embodiment of the present invention. It is not a limitation on the scope of the present invention. The measurement device of the present invention may comprise two or more detectors. The neutron source 101 may be pulsed at different frequencies and modes for different types of measurements. Detector short-spaced (SS) detector 105 is closest to the source 101. The long-spaced (LS) detector is denoted by 106, and the furthest detector 107 is referred to as the extra-large spaced (XLS) detector. Fast neutrons (approximately 14 MeV) are emitted from the source 101 and enter the borehole and formation, where they undergo several types of interactions. During the first few microseconds (µs), before they lose much energy, some neutrons are involved in inelastic scattering with nuclei in the borehole formation and produce gamma rays. These inelastic gamma rays 120, have energies that are characteristic of the atomic nuclei that produced them. The atomic nuclei found in this environment include, for example, carbon, oxygen, silicon, calcium, and some others.

Two or more gamma-ray detectors are employed, in one or more modes of operation. Such modes include, but are not limited to, a pulsed neutron capture mode, a pulsed neutron spectrometry mode, a pulsed neutron holdup imager mode, and a neutron activation mode. In a pulsed neutron capture mode, for example, the tool pulses at 1 kHz, and records a complete time spectrum for each detector. An energy spectrum is also recorded for maintaining energy discrimination levels. Time spectra from short-spaced and long-spaced detectors can be processed individually to provide traditional thermal neutron capture cross section information, or the two spectra can be used together to automatically correct for borehole and diffusion effects and produce results substantially approximating intrinsic formation values.

In a pulsed neutron spectrometry mode, the instrument pulses at 10 kHz, for example, and records full inelastic and capture gamma ray energy spectra from each detector. These data are processed to determine critical elemental ratios including carbon/oxygen and calcium/silicon from the inelastic spectra and silicon/calcium from the capture spectra. A pulsed neutron holdup imager mode yields both energy spectra and time decay spectra from each detector simultaneously. Measurements can be used to determine holdups of gas, oil, and water. When combined with other production logs, the measurements made herein can provide a comprehensive production profile picture, even in deviated or horizontal wells. A neutron activation mode provides water-flow measurements using one of several data acquisition methods. Stationary measurements are made in either of two modes, and measurements at different logging speeds can be used to segregate different flow rates in either an annulus or in an adjacent tubing string. Various spectra of count rates from these can be used either individually or in combination as needed for each measurement mode.

With the neutron generator turned off, the measurement apparatus can also be used to detect the distribution of materials, tagged with radioactive tracers, that are injected into the well during well treatments. In this manner, the effectiveness of operations such as hydraulic fracturing or gravel pack placement can be evaluated.

In an embodiment of the present invention, a pulsed neutron generator with improved reliability and higher output is coupled with high-speed downhole microprocessor-controlled drivers and detector electronics. The system supports multiple frequency operation and different detection gate timings to make the different measurements. The modes of operation can be selected from the surface with no need to pull the tool out of the well.

After just a few µs, most of the neutrons are slowed by either inelastic or elastic scattering until they reach thermal energies, about 0.025 eV. This process is illustrated schematically in FIG. 1 as the sequence of solid arrows 110. At thermal energies, neutrons continue to undergo elastic collisions, but they no longer lose energy on average. A few µs after the neutron generator shuts off, this process is complete. Over the next several hundred µs, thermal neutrons are captured by nuclei of various elements—again producing gammas rays, known as capture gamma rays 130. A capture gamma ray energy spectrum yields information about the relative abundances of these elements.

The rate at which the thermal neutron population is captured can be determined from the total number of capture gamma rays recorded as a function of time. This time decay spectrum can provide information about those elements with large cross sections for (or high probabilities of) thermal neutron capture.

Typically, the precision and accuracy of a given detector are dependent on the distance from the detector to the source. At shorter distances, a significant number of received signals are attributable to material residing in the borehole region, rather than in the earth formation being investigated. The accuracy of such a measurement at short source-detector distances is thereby reduced. On the other hand, close proximity of a detector to a source results in a high signal strength. This high signal strength leads to a high degree of statistical precision of the measurement taken at that short distance. At longer distances between detector and source, an increased percentage of signals are obtained from the earth formation, thereby leading to a higher degree of accuracy of the measurement obtained. However, the number of signals obtained by the detector is significantly reduced due to the increased distance and diffusion processes. Lack of sufficient signal strength yields a lower statistical precision of the measurement.

Figure 2:
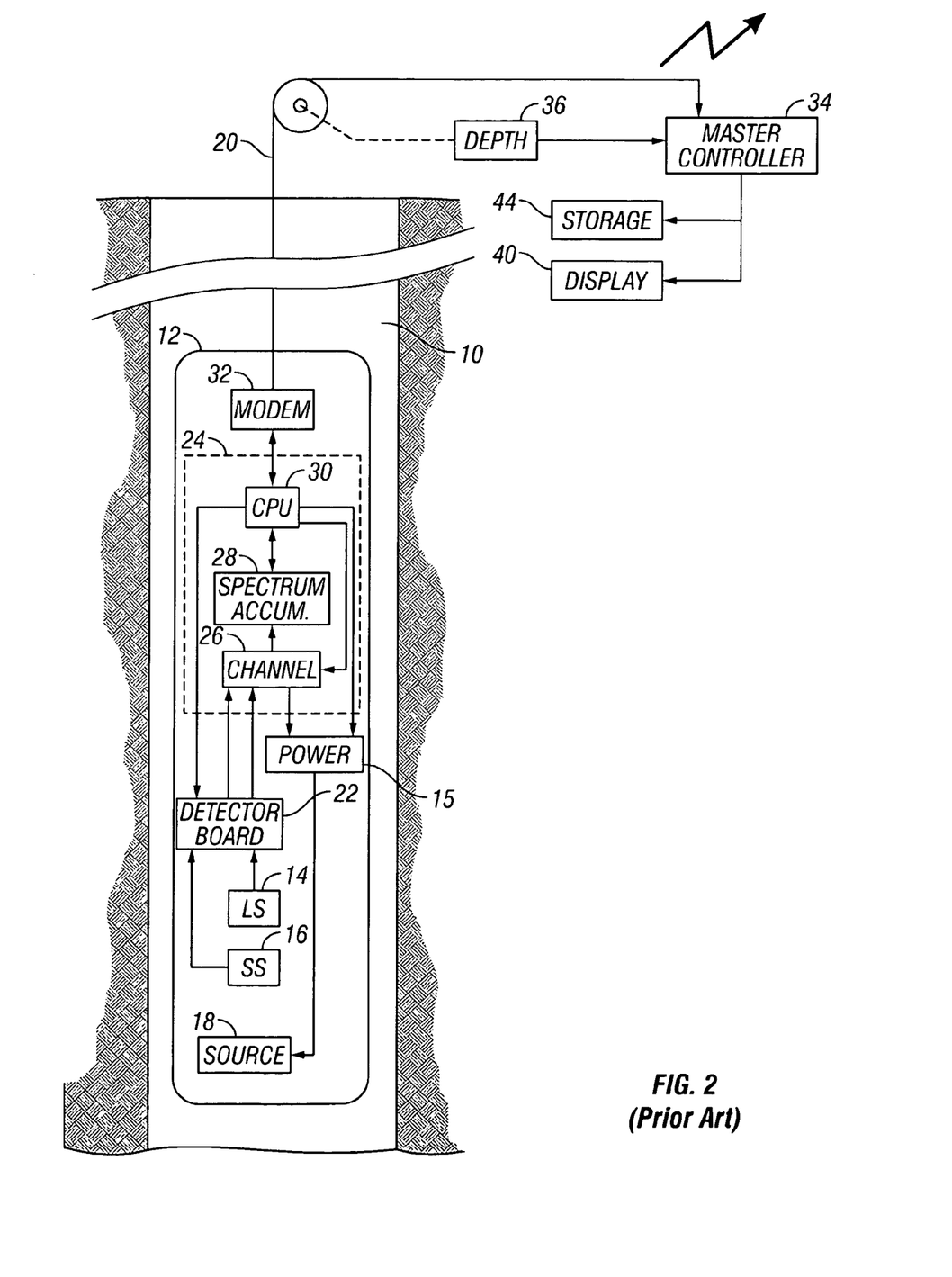
FIG. 2 is an overall schematic diagram of the nuclear well logging system of the present invention.

In the present invention described above with reference to FIG. 1, the SS detector 105 measures the received signals at a high level of precision. As the source-detector spacing increases, this level of precision drops, so that measurements at LS detector 106 are not as precise as the measurements from the SS detector. On the other hand, measurements obtained at the SS detector are highly perturbed by interaction with elements within the borehole. Increasing the spacing between source and detector reduces the perturbative effects of the borehole, thereby increasing the accuracy of the measurement at the XLS detector 107. The logging tool described above may be part of a system, such as that illustrated in FIG. 2. The system shown in FIG. 2 is a prior art system. Well 10 penetrates the earth's surface and may or may not be cased depending upon the particular well being investigated. Disposed within well 10 is subsurface well logging instrument 12. The system diagramed in FIG. 2 is a microprocessor-based nuclear well logging system using multi-channel scale analysis for determining the timing distributions of the detected gamma rays. Well logging instrument 12 includes long-spaced (LS) detector 14, short-spaced (SS) detector 16 and pulses neutron source 18. In one embodiment, LS and SS detectors 14 and 16 are comprised of bismuth-germanate (BGO) crystals coupled to photomultiplier tubes. To protect the detector systems from the high temperatures encountered in boreholes, the detector system may be mounted in a Dewar-type flask. Also, in the preferred embodiment, source 18 comprises a pulsed neutron source using a D-T reaction wherein deuterium ions are accelerated into a tritium target, thereby generating neutrons having an energy of approximately 14 MeV. The filament current and accelerator voltage are supplied to source 18 through power supply 15. Cable 20 suspends instrument 12 in well 10 and contains the required conductors for electrically connecting instrument 12 with the surface apparatus.

The outputs from LS and SS detectors 14 and 16 are coupled to detector board 22, which amplifies these outputs and compares them to an adjustable discriminator level for passage to channel generator 26. Channel generator 26 is a component of multi-channel scale (MCS) section 24 which further includes spectrum accumulator 28 and central processor unit (CPU) 30. As will be explained later, MCS section 24 accumulates spectral data in spectrum accumulator 28 by using a channel number generated by channel generator 26 and associated with a pulse as an address for a memory location. After all of the channels have had their data accumulated, CPU 30 reads the spectrum, or collection of data from all of the channels, and sends the data to modem 32 which is coupled to cable 20 for transmission of the data over a communication link to the surface apparatus. Also to be explained later is the further function of channel generator 26 in generating synchronization signals which control the pulse frequency of source 18, and further functions of CPU 30 in communicating control commands which define certain operational parameters of instrument 12 including the discriminator levels of detector board 22, and the filament current and accelerator voltage supplied to source 18 by power supply 15.

The surface apparatus includes master controller 34 coupled to cable 20 for recovery of data from instrument 12 and for transmitting command signals to instrument 12. There is also associated with the surface apparatus depth controller 36 which provides signals to master controller 34 indicating the movement of instrument 12 within well 10. The system operator accesses the master controller 34 to allow the system operator to provide selected input for the logging operation to be performed by the system. Display unit 40 and mass storage unit 44 are also coupled to master controller 34. The primary purpose of display unit 40 is to provide visual indications of the generated logging data as well as systems operations data. Storage unit 44 is provided for storing logging data generated by the system as well as for retrieval of stored data and system operation programs. A satellite link may be provided to send data and or receive instructions from a remote location.

In a well logging operation such as is illustrated by FIG. 2, master controller 34 initially transmits system operation programs and command signals to be implemented by CPU 30, such programs and signals being related to the particular well logging operation. Instrument 12 is then caused to traverse well 10 in a conventional manner, with source 18 being pulsed in response to synchronization signals from channel generator 26. Typically, source 18 is pulsed at a rate of 1000 bursts/second (1 KHz). This, in turn, causes a burst of high energy neutrons on the order of 14 MeV to be introduced into the surrounding formation to be investigated. In a manner previously described, this population of high energy neutrons introduced into the formation will cause the generation of gamma rays within the formation which at various times will impinge on LS and SS detectors 14 and 16. As each gamma ray thus impinges upon the crystal-photomultiplier tube arrangement of the detectors, a voltage pulse having an amplitude related to the energy of the particular gamma ray is delivered to detector board 22. It will be recalled that detector board 22 amplifies each pulse and compares them to an adjustable discriminator level, typically set at a value corresponding to approximately 100 KeV. If such pulse has an amplitude corresponding to an energy of at least approximately 100 KeV, the voltage pulse is transformed into a digital signal and passed to channel generator 26 of MCS section 24.

The system of the present invention may differ from the prior art system in that three detectors may be used. This has been discussed above. In addition, as would be known to those versed in the art, many of the functions of the components described with reference to FIG. 2 may be carried out by a processor. It should also be noted that the system described in FIG. 2 involves conveyance of the logging device into the well by a wireline. However, it is envisaged that the logging device could be part of a measurement while drilling (MWD) bottom hole assembly conveyed into the borehole by a drilling tubular such as a drillstring or coiled tubing.

In a multi-detector device, several measurements of capture cross-sections can be obtained. These measurements can be combined to create a combined capture cross-section:

$$\Sigma_{comb} = \omega_1 \Sigma_1 + \omega_2 \Sigma_2 + \cdots \quad (1)$$

where $\Sigma_i$ is the capture cross-section measured at detector i, and $\omega_i$ is a corresponding weight of the $i^{th}$ capture cross-section. The weight of an individual capture cross-section can be typically determined by a statistical precision of the measurement. For example, the weight can be inversely proportionally to the standard deviation of the measurement at a given detector:

$$\omega_i = \frac{1}{\sigma_i^2} \quad (2)$$

where σ is the variance of the measurement of the $i^{th}$ detector. This weighting is done currently, for example, for C/O measurements. Variance can be measured in a variety of ways. As an example, with the RPM system, σ can be determined by measuring an average arrival time of the gamma rays at the detector, and relating this average time to a decay rate. The average time technique is a remarkably robust and statistically precise method of computing Σ.

The computation of the true or "intrinsic" formation sigma is complicated by the fact that the raw data from the instrument contain contributions from the borehole as well as from the formation. In general, the early part of the decay is most affected by neutron absorption in the borehole and the late decay by formation absorption, although they are not completely independent of each other. That is, the borehole influences the formation decay and the formation influences the borehole decay. A typical computation of sigma minimizes the borehole influence by using a late portion of the decay for the formation sigma calculation.

Combined pulsed neutron capture data from multiple detectors can be used in such a way as to improve the statistical precision and the accuracy of the measurement. The term "precision" refers, in a general sense, to the repeatability of the measurements, i.e., a more precise sensing device will give the same value for repeated measurements of the same parameter. The term "accuracy" refers to how close the output of a sensing device is to the true value of the quantity being measured. Thus, a precise measurement that has a bias is not an accurate measurement.

In a preferred embodiment of the invention, a weighted combination of data from two or more detectors is used to provide measurements with statistical precision superior to any one of the individual detectors alone. Such combinations will have measurement characteristics that are somewhat different from those of any individual detector alone. As discussed above, the XLS detector 107 achieves a higher degree of accuracy over the measured interval than measurements of the SS 105 and LS 106 detector. The XLS 107 detector will also have a lower resolution and lower precision than the LS and SS detectors. In the present invention, a measurement is obtained with an accuracy of a measurement from the XLS detector and a precision obtained from a weighted normalized $\Sigma_{comb}$. This can be done in the manner described next.

Figure 3:
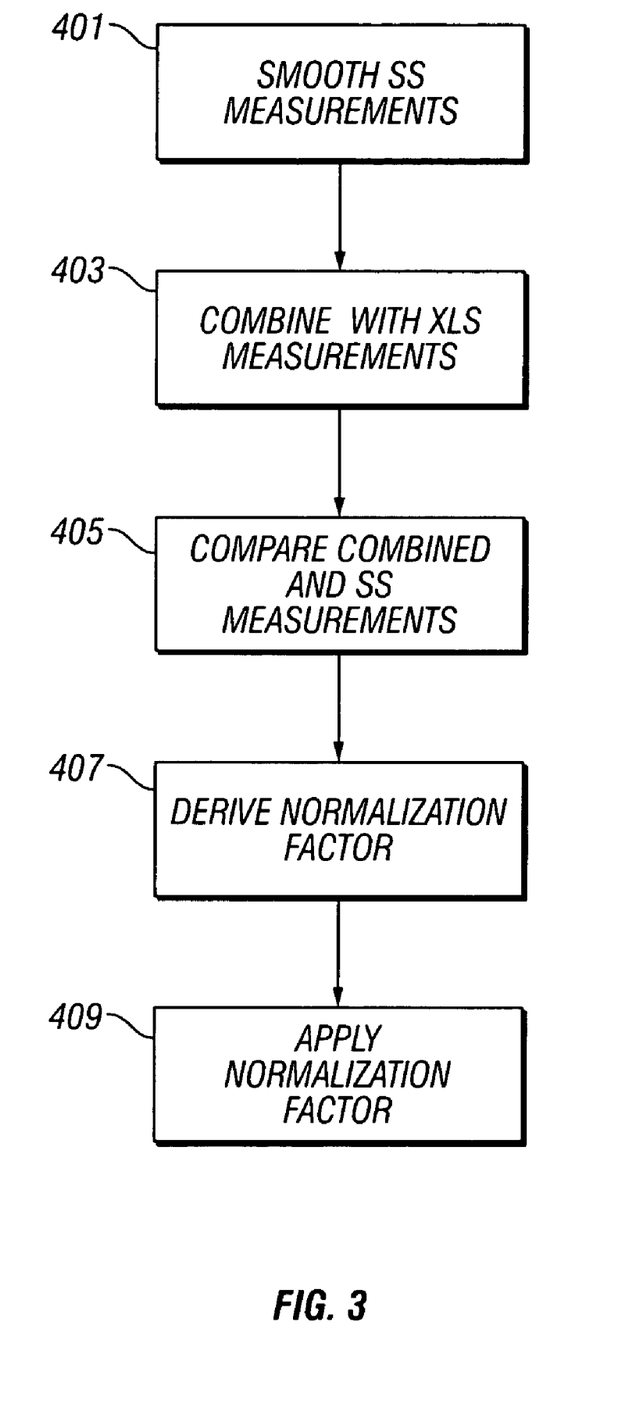
FIG. 3 shows a flow chart of the method of the present invention.

Turning now to FIG. 3, one embodiment of the invention is shown. A first set of measurements, preferably the SS measurements, are smoothed 401 by a suitable filtering operation to match the resolution of a second set of measurements, preferably the XLS measurements. The resulting smoothed SS measurements has an even smaller standard deviation (higher precision) than the original SS measurements. The smoothed measurements are then combined 403 with a second set of measurements (preferably the XLS measurements) using eq. (1) to give a combined measurement. This combined measurement will be more accurate than the first measurements. U.S. Pat. No. 4,794,792 to Flaum, et al, discusses a step similar to the filtering carried out herein, but does not teach or suggest combining the measurements to give a measurement with improved accuracy. Next, the combined measurements are compared with the first measurements 405. Using this comparison, a normalization factor is determined 407 and applied 409 to the first measurements to give a normalized measurement. The normalized measurements will be more accurate than the first measurements. The normalization factor may be additive or multiplicative, depending upon the type of measurements being used. Optionally, the normalized measurements may be combined with the XLS measurements using eq. (1).

In a second, preferred embodiment of the invention, a sequence of steps similar to that outlined in FIG. 3 is carried out with one difference: the first set of measurements include both the SS and LS measurements. In this manner, a more precise and more accurate measurement with reasonably high resolution is obtained.

The processing of the data may be accomplished using a processor that may be located downhole or at an uphole location. Once the measurement accuracy and precision have been improved using the methods described above, the parameter of interest may be obtained using well known prior art techniques. As would be known to those versed in the art, parameters of interest that may be determined by nuclear logging tools include a density and a porosity of the earth formation.

The logging instrument as described above is suitable for use on a wireline or may be conveyed into the borehole on a measurement while drilling device using a drilling tubular such as a drillstring or coiled tubing. When a drilling tubular is used, the measurement apparatus is usually part of a bottom hole drilling assembly. Such conveyance devices are known in the art and are not discussed further here.

The present invention has been described with reference to a nuclear logging instrument. However, the method of the present invention may also be used with other types of logging instruments, including an acoustic logging instrument. In an acoustic logging instrument, signals generated from an acoustic source propagate through an earth formation and are detected at a plurality of spaced apart detectors. Due to the passage through a dispersive earth formation, the signals suffer degradation at increased source-receiver distances.

Additionally, the method of the present invention may also be used when, for example, the first and second detectors are at the same distance from the source. However, if the second detector is sampled more frequently than the first detector, then the second detector will be less precise than and as accurate as the first detector.

While the foregoing disclosure is directed to the preferred embodiments of the invention, various modifications will be apparent to those skilled in the art. It is intended that all such variations within the scope and spirit of the appended claims be embraced by the foregoing disclosure.

What is claimed is:

1. A method for determining a parameter of interest of an earth formation with a logging tool having an energy source and a plurality of detectors for making measurements resulting from interaction of said energy source with said earth formation, the method comprising:
   (a) making a first measurement indicative of said parameter of interest at a first of said plurality of detectors, said first measurement having a first precision;
   (b) making a second measurement indicative of said parameter of interest at a second of said plurality of detectors, said second measurement having a second precision not greater than said first precision;
   (c) forming a weighted sum of said first and second measurements to give a processed measurement having a higher precision than the first measurement; and
   (d) recording the processed measurement on a suitable medium.

2. The method of claim 1 wherein said energy source comprises a source of radiation.

3. The method of claim 1 wherein said first measurement has a first accuracy, said second measurement has a second accuracy not less than said first accuracy, and wherein said processed measurement has an accuracy at least the same as said second accuracy.

4. The method of claim 3 further comprising: making a third set of measurements indicative of said parameter of interest, said third measurements having a precision intermediate to said first and second precisions and a third accuracy intermediate to said first and second accuracies; and wherein combining said first and, second measurements further comprises combining the third measurement with the first and second measurements.

5. The method of claim 4 wherein said first measurement is made with a first detector having a first distance from said source, and said second measurements are made with a second detector having a second distance from said source greater than said first distance.

6. The method of claim 5 wherein said third measurement is made with a third detector having a distance from said source that is intermediate to said first and second distances.

7. The method of claim 4 wherein combining said first, second and third measurements further comprises forming a weighted sum of said first, second and third measurements.

8. The method of claim 7 further comprising determining weights for said weighted sum using a measure of statistical precision.

9. The method of claim 8 wherein said measure is based at least in part on a standard deviation of a detected signal.

10. The method of claim 4 wherein combining said first, second and third measurements further comprises filtering said first and third measurements to give output measurements having a resolution that is substantially equal to a resolution of said second measurement.

11. The method of claim 10 further comprising determining said parameter of interest from said processed measurements.

12. The method of claim 1 wherein said measurements comprise gamma ray counts.

13. The method of claim 1 wherein said measurements comprise neutron counts.

14. The method of claim 1 further comprising determining weights for said weighted sum using a standard deviation of measurements for each of the detectors.

15. The method of claim 1 wherein combining said first and second measurements further comprises filtering said first measurement to give filtered measurements having a resolution that is substantially equal to a resolution of said second measurement.

16. The method of claim 1 wherein said parameter of interest comprises a porosity of said formation.

17. The method of claim 1 wherein said parameter of interest comprises a density of said formation.

18. The method of claim 1 wherein said first and second detectors are at the same spacing from said source, and wherein said second detector is sampled more frequently than said first detector.

19. A method for determining a parameter of interest of an earth formation with a logging tool having a source for irradiating said earth formation, and a plurality of detectors spaced apart from the source for making measurements resulting from interaction of said energy source with said earth formation, the method comprising:
   (a) making a first, second and third set of measurements indicative of said parameter of interest with first, second and third detectors, said first, second and third measurements each having a precision, resolution and accuracy;
   (b) forming a weighted sum of said first, second and third measurements to give a processed measurement having a higher precision than the most precise of said measurements and having a higher accuracy than the least accurate of said measurements; and
   (c) recording the processed measurement on a suitable medium.

20. The method of claim 19 wherein combining said measurements further comprises filtering a selected one of said measurements having higher resolution to match a resolution of another selected one of said measurements having a lower resolution.

21. The method of claim 19 wherein combining the measurements further comprises deriving a normalization factor for at least one of said measurements and applying said normalization factor thereto.

22. An apparatus for determining a parameter of interest of an earth formation comprising:
   (a) a logging tool configured to be conveyed into a borehole in said earth formation, said logging tool including a source which propagates energy into said earth formation;
   (b) a first detector on said logging tool spaced apart from the source at a first distance, said first detector configured to make a first measurement indicative of an interaction of said energy with said earth formation, said first measurement having a first precision;
   (c) a second detector on said logging tool spaced apart from the source at a second distance greater than the first distance, said second detector configured to make a second measurement indicative of said parameter of interest, said second measurement having a second precision not greater than said first precision; and
   (d) a processor configured to form a weighted sum of said first and second measurements to give a processed measurement having a higher precision than the first measurement.

23. The apparatus of claim 22 wherein said second measurement has a second accuracy not less than a first accuracy of said first measurement, and wherein said processed measurement has at least the same accuracy of the second measurement.

24. The apparatus of claim 22 further comprising a memory device configured to store said first and second measurements.

25. The apparatus of claim 22 wherein said source comprises a pulsed neutron source.

26. The apparatus of claim 22 further comprising a third detector on said logging tool spaced apart from said source at a third distance intermediate to said first and second distances, and wherein said processor is further configured to combine measurements made by said third detector with measurements made by said first and second detectors.

27. A system for determining a parameter of interest of an earth formation comprising:
   (a) a logging tool including a neutron source configured to irradiate said earth formation;
   (b) a first detector on said logging tool spaced apart from the source at a first distance, said first detector configured to make a first measurement indicative of an interaction of said energy source with said earth formation, said first measurement having a first precision;
   (c) a second detector on said logging tool spaced apart from the source at a second distance greater than the first distance, said second detector configured to make a second measurement indicative of said parameter of interest, said second measurement having a second precision not greater than said first precision;
   (d) a conveyance device configured to convey said tool into said borehole;
   (e) a processor configured to form a weighted sum of said first and second measurements to give a processed measurement having a higher precision than said first measurement.

28. The system of claim 27 wherein said neutron source comprises a pulsed neutron source.

29. The system of claim 27 wherein said conveyance device comprises a wireline.

30. The system of claim 27 wherein said conveyance device comprises a drillstring.

31. The system of claim 30 wherein said logging tool is part of a bottom hole drilling assembly.

32. The system of claim 27 wherein said conveyance device comprises a drilling tubular.

33. The system of claim 27 wherein said processor is at a surface location.

* * * * *